United States Patent

[11] 3,624,138

[72] Inventors Keisuke Murayama;
 Shyoji Morimura; Takao Yoshioka;
 Hideo Horiuchi, all of Tokyo, Japan
[21] Appl. No. 583,055
[22] Filed Sept. 29, 1966
[45] Patented Nov. 30, 1971
[73] Assignee Sankyo Company Limited
 Chuyuo-ku, Tokyo, Japan
[32] Priorities Oct. 7, 1965
[33] Japan
[31] 40/61562;
 Oct. 7, 1965, Japan, No. 40/61563

[54] PHENOL FORMATES
 5 Claims, No Drawings
[52] U.S. Cl. ..................................... 260/479 R,
 252/404, 260/45.85
[51] Int. Cl. .......................................... C07c 69/06
[50] Field of Search .......................... 260/479

[56] References Cited
OTHER REFERENCES

Muramatsu et al., J. Chem Soc., Japan, Pure Chem. Sect., Vol. 86 (Jan., 1965), pages A7 and 113.

Sofuku et al., Bull. Chem. Soc., Japan, Vol. 4o (1967) 292942- 2943.

Olam, Friedel-Crafts and Related Reactions, Vol. III part 2, Wiley & Sons, New York (1964) pp. 1211, 1212, 1227

Morokuma et al., Bull. Chem. Soc., Japan 36(5) pp. 541–546 (1963)

Chem. Abst., Vol. 48, 9722f, citing Yoshikawa et al. (1954)
Chem. Abst., Vol. 54, 364c, citing Isaguhiants et al. (1960)
Chem. Abst., Vol. 54, 1263b, citing Br. Patent 827,632 (1960)

Wagner et al., " Synthetic Org. Chem." Wiley & Sons, New York (1953) pp. 480– 481

Van Es et al., Recueil des Travaux Chim., Vol. 84, No. 9–10 (available to public Nov. 2, 1965)

*Primary Examiner*—James A. Patten
*Assistant Examiner*—Vivian Garner
*Attorney*—McGlew and Toren ABSTRACT: New phenol formates of the formula

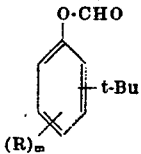

wherein R is a straight or branched alkyl, $m$ is O to 3 and t-Bu is tert-butyl. Such phenol formates are prepared by reacting an alkyl phenol of the formula

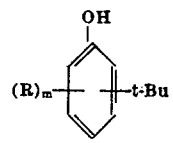

wherein R, $m$ and t-Bu are as defined above with (A) a formamide derivative and a chloride or (B) formic acid in the presence of an esterification catalyst. The phenol formates are superior antidegradants and stabilizers.

PHENOL FORMATES

This invention relates to novel phenol formates and a novel process for preparing the same. More particularly, it relates to a new class of the alkylphenol formates having the formula

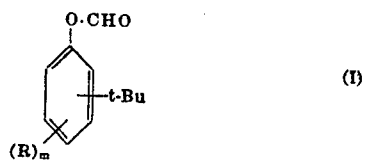

wherein R represents a straight or branched alkyl group such as methyl, ethyl, n-propyl, isopropyl, n-butyl, tert.-butyl, n-pentyl, n-hexyl, n-heptyl or tert.-octyl, $m$ is an integer of 0 to 3 inclusive and, where $m$ is an integer of 2 to 3, R's may be the same or different and t-Bu represents tert.-butyl group and a novel process for preparing the same.

The alkylphenol formates of the above-mentioned formula (I) are novel compounds unknown in the prior art.

They have been found to be highly active antidegradants or stabilizers for various organic materials including fats and oils, natural and synthetic rubbers and other polymeric materials.

It has also been found that the alkyl phenol formates of the above-mentioned formula (I) can be prepared by a novel process characterized in that the alkyl phenol having the formula

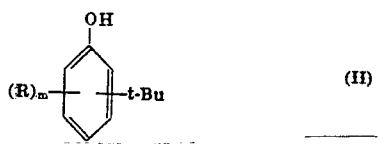

wherein R, $m$ and t-Bu have the same meanings as set forth above is subjected to Vilsmeier reaction or to the reaction with formic acid in the presence of an esterification catalyst.

Accordingly, it is an object of this invention to provide novel alkyl phenol formates of the above-mentioned formula (I) which are useful as an antidegradant.

Another object of this invention is to provide a novel process for the preparation of the alkyl phenol formates of the above-mentioned formula (I).

Other objects will be apparent from the following detailed description.

In carrying out the process of this invention, one embodiment of the present process is in that the alkyl phenol of the above-mentioned formula (II) is subjected to Vilsmeier reaction. In this reaction, there may be employed any of various Vilsmeier reagents which are known by those skilled in the art, that is, any combination of a formamide derivative and a chloride.

Suitable examples of the chloride to be employed include phosphorus oxychloride, phosgene, thionyl chloride and phosphorus pentachloride. Examples of the formamide derivatives to be employed include dimethyl formamide, diethyl formamide, methylformamide and methylphenylformamide, but dimethylformamide is most preferable because of commercial availability. The reaction temperature is generally in the range of about 70°–100° C. and most preferably the reaction is conducted at about 80° C. The reaction period will mainly depend upon the kind and amount of the starting material employed as well as the reaction temperature applied, but in general the reaction is completed from approximately 5–15 hours.

Any other solvent will not be required in this reaction since the formamide derivative will act as both a reagent and a solvent by employing it in an excess over the stoichiometrically required amount.

After completion of the reaction, the reaction product may be easily recovered and purified by a conventional means.

Another embodiment of the present process is the reaction of the alkyl phenol of the above-mentioned formula (II) with formic acid in the presence of an esterification catalyst to form the formate of this invention. In this reaction, there may be conveniently employed any catalyst which is commonly known as an esterification catalyst in the art. Typical examples of these catalysts which may be employed in this invention include polyphosphoric acid alkyl esters, p-toluenesulfonic acid, phosphorus oxychloride and polyphosphoric acid. Requirement for the solvent and the reaction temperature and period may be optionally selected and determined by those skilled in the art, based upon the catalyst employed. For instance, where polyphosphoric acid alkyl esters are employed, the reaction is generally conducted in the absence of a solvent at room temperature for about 5–15 hours, and, where p-toluenesulfonic acid is employed, the reaction is generally conducted in the presence of a suitable solvent such as benzene, ligroin, petroleum benzine and the like at about 70°–100° C. for about 10–20 hours. After completion of the reaction, the reaction product may be easily recovered and purified by a conventional means.

Representative of the alkyl phenol formates which can be prepared by the process of this invention are the following;
4-methyl-6-tert.-butyl phenol formate,
3-methyl-6-tert.-butyl phenol formate,
3-methyl-4,6-di-tert.-butyl phenol formate,
2,4-di-tert.-butyl-5-methyl phenol formate,
3,4-dimethyl-6-tert.-butyl phenol formate,
2-methyl-4-tert.-butyl phenol formate,
4-ethyl-6-tert.-butyl phenol formate,
3-ethyl-6-tert.-butyl phenol formate,
3-tert.-octyl-6-tert.-butyl phenol formate,
2,4-di-tert.-butyl phenol formate.

The following examples serve to illustrate this invention without intending to limit it thereto.

EXAMPLE 1

Preparation of 3-methyl-6-tert.-butylphenol formate

To a cooled solution of 20 g. of phosphorus oxychloride in 20 ml. of dimethylformamide were added 20 g. of 3-methyl-6-tert.-butylphenol while maintaining the temperature at 5°–20 ° C. with ice-cooling. The reaction was carried out at 80° C. for 10 hours. After completion of the reaction, the reaction mixture was poured into ice-water, the resulting mixture neutralized with aqueous sodium acetate and extracted several times with petroleum-ether. The combined extracts were washed successively with aqueous sodium carbonate and water, dried over anhydrous sodium sulfate and distilled in vacuum, thereby yielding 16.9 g. of the desired product, boiling at 92°–94 C./4.5 mmHg.
Yield: 84.5 percent
Analysis:

Calculated for $C_{12}H_{16}O_2$: C, 74.19; H, 9.34
Found: C, 74.40; H, 9.58.

Infrared spectrum (liquid film):
1743 cm.$^{-1}$(ester; $\nu C.=0$), 1187 cm.$^{-1}$(formic acid ester; $\nu c.=0$N.M.R spectrum ($CCl_4$):

Absorption band of proton of benzene ring with an intensity of 3H at $\iota=2.8$–3.7.

EXAMPLE 2

Preparation of 4-methyl-6-tert.-butylphenol formate

Following the same procedure as in example 1 but employing 10 g. of 4-methyl-6-tert.-butylphenol, 10 ml. of dimethylformamide and 10 g. of phosphorus oxychloride, there were obtained 8.5 g. of the desired product, boiling at 89° C./4 mmHg.
Yield: 77.3 percent.
Analysis:

Calculated for $C_{12}H_{16}O_2$: C, 74.19; H, 9.34.
Found: C, 74.37; H, 9.48.

Infrared spectrum (liquid film):

1743 cm.⁻¹(ester: νc.=O), 1167 cm.⁻¹(formic acid ester: νc.=O). insert Preparation of 2,4-di-tert.-butyl-5-methylphenol formate Following the same procedure as in example 1 but employing 10 g. of 2,4-di-tert.-butyl-5-methyl phenol, 10 ml. of dimethylformamide and 10 g. of phosphorus oxychloride, there were obtained 9.1 g. of the desired product as pale brown crude crystals. The crude product so obtained was recrystallized from ethanol to give 8.2 g. of the desired product as white crystals, melting at 78°–79° C.
Yield: 73.0 Percent.
Analysis:

| Calculated for $C_{16}H_{24}O_2$: | C, 77.37; H, 9.74. |
|---|---|
| Found: | C, 77.10; H, 9.57. |

Infrared spectrum (nujol):
1752 cm.⁻¹(ester: νc.=O), 1185 cm.⁻¹(formic acid ester: νc.=O).

EXAMPLE 4

Preparation of 4-tert.-octyl-6-tert.-butyl phenol formate

To a solution obtained by dropwise-addition of 10 g. of phosphorus oxychloride to 20 ml. of dimethylformamide with stirring and ice-cooling were added 9 g. of 4-tert.-octyl-6-tert.-butyl phenol. The resulting mixture was heated with stirring at 85° C. for 32 hours. After completion of the reaction, the reaction mixture was poured into ice-water, the resulting mixture neutralized with aqueous sodium carbonate and extracted several times with benzene. The combined extracts were washed successively with aqueous sodium carbonate and water, dried over anhydrous sodium sulfate and then distilled in vacuum, thereby yielding 7.2 g. of the desired product, boiling at 115°–117° C./2.5 mmHg.
Yield: 72.0 percent.
Analysis:

| Calculated for $C_{19}H_{30}O_2$: | C, 78.57; H, 10.41. |
|---|---|
| Found: | C, 78.92; H, 10.60. |

Infrared spectrum (liquid film):
1745 cm.⁻¹(ester; νc.=O), 1190 cm.⁻¹(formic acid ester: νc.=O).

EXAMPLE 5

Preparation of 2,4-di-tert.-butylphenol formate

With stirring and ice-cooling, 56 g. of phosphorus oxychloride were added to 100 ml. of dimethylformamide and to the resulting solution were added 50 g. of 2,4-di-tert.-butylphenol. The solution so obtained was heated with stirring at 90°–95 C. for 9 hours. After completion of the reaction, the reaction mixture was treated in the same manner as in example 4, thereby yielding the desired product as colorless oily substances, boiling at 113°–116° C./3.5 mmHg.
Analysis:

| Calculated for $C_{15}H_{22}O_2$: | C, 76.88; H, 9.46. |
|---|---|
| Found: | C, 77.06; H, 9.62 |

Infrared spectrum (liquid film):
1750 cm.⁻¹(ester: νc.=O), 1190 cm.⁻¹ (formic acid ester: νc.=O).

EXAMPLE 6

Preparation of 3-methyl-6-tert.-butylphenol formate

A mixture of 10 g. of 3-methyl-6-tert.-butyl phenol, 5 g. of 98 percent formic acid and 50 g. of polyphosphoric acid ethyl ester was stirred at room temperature for 8 hours and then allowed to stand at that temperature overnight. Thereafter, the reaction mixture was poured into ice-water and extracted several times with benzene. The combined extracts were washed successively with water, a 5 percent aqueous sodium carbonate solution and again water, dried over anhydrous sodium sulfate and then distilled in vacuum, thereby yielding 7.5 g. of the desired product as colorless oils, boiling at 90°–91 °C./3 mmHg.
Yield: 64.2 percent.
Analysis:

| Calculated for $C_{12}H_{16}O_2$: | C, 74.19; H, 9.34. |
|---|---|
| Found: | C, 74.42; H, 9.53. |

Infrared spectrum (liquid film):
1743 cm.⁻¹ (ester: νc.=O), 1187 cm.⁻¹ (formic acid ester: νc.=O).

EXAMPLE 7

Preparation of 4-methyl-6-tert.-butylphenol formate

A solution of 50 g. of 4-methyl-6-tert.-butyl phenol, 30 g. of 98 percent formic acid and 2.0 g. of p-toluenesulfonic acid in 200 ml. of benzene was heated under reflux for 15 hours. After completion of the reaction, the reaction mixture was washed successively with water, a 5 percent aqueous sodium carbonate solution and again water, dried over anhydrous sodium sulfate and then distilled under reduced pressure, thereby yielding 43.1 g. of the desired product as colorless oils, boiling at 86°–88° C./4 mmHg.
Analysis:

| Calculated for $C_{12}H_{16}O_2$: | C, 74.19; H, 9.34. |
|---|---|
| Found: | C, 74.48; H, 9.59. |

Infrared spectrum (liquid film):
1743 cm.⁻¹ (ester: νc.=O), 1167 cm.⁻¹ (formic acid ester: νc.=O).

EXAMPLE 8

Preparation of 2,4-di-tert.-butyl-5-methylphenol formate

A mixture of 10 g. of 2,4-di-tert.-butyl-5-methyl phenol, 10 g. of 98 percent formic acid and 10 g. of phosphorus oxychloride was heated at a temperature of 70°–80° C. for 6 hours. After completion of the reaction, the reaction mixture was poured into ice-water and the resulting mixture was extracted several times with benzene. The combined extracts were washed successively with water, a 5 percent aqueous sodium carbonate solution and again water, dried over anhydrous sodium sulfate and the solvent was distilled off. The residue thus obtained was recrystallized from ethanol to give 5.6 g. of the desired product as white crystals, melting at 78°–79 C.
Yield: 49.9 percent
Analysis:

| Calculated for $C_{16}H_{24}O_2$: | C, 77.37; H, 9.74. |
|---|---|
| Found: | C, 77.52; H, 9.88. |

Infrared spectrum (nujol):
1752 cm.⁻¹(ester: νc.=O), 1185 cm.⁻¹(formic acid ester: νc.=O).

We claim:
1. 3-Methyl-6-tert.-butyl phenol formate.
2. 4-Methyl-6-tert.-butyl phenol formate.
3. 2,4-Di-tert.-butyl-5-methyl phenol formate.
4. 4-tert.-Octyl-6-tert.-butyl phenol formate.
5. 2,4-Di-tert.-butyl phenol formate.

* * * * *